F. SKELTON.
HANDLE FOR SHOVELS, SPADES, AND OTHER TOOLS.
APPLICATION FILED MAY 18, 1908.
914,678.
Patented Mar. 9, 1909.
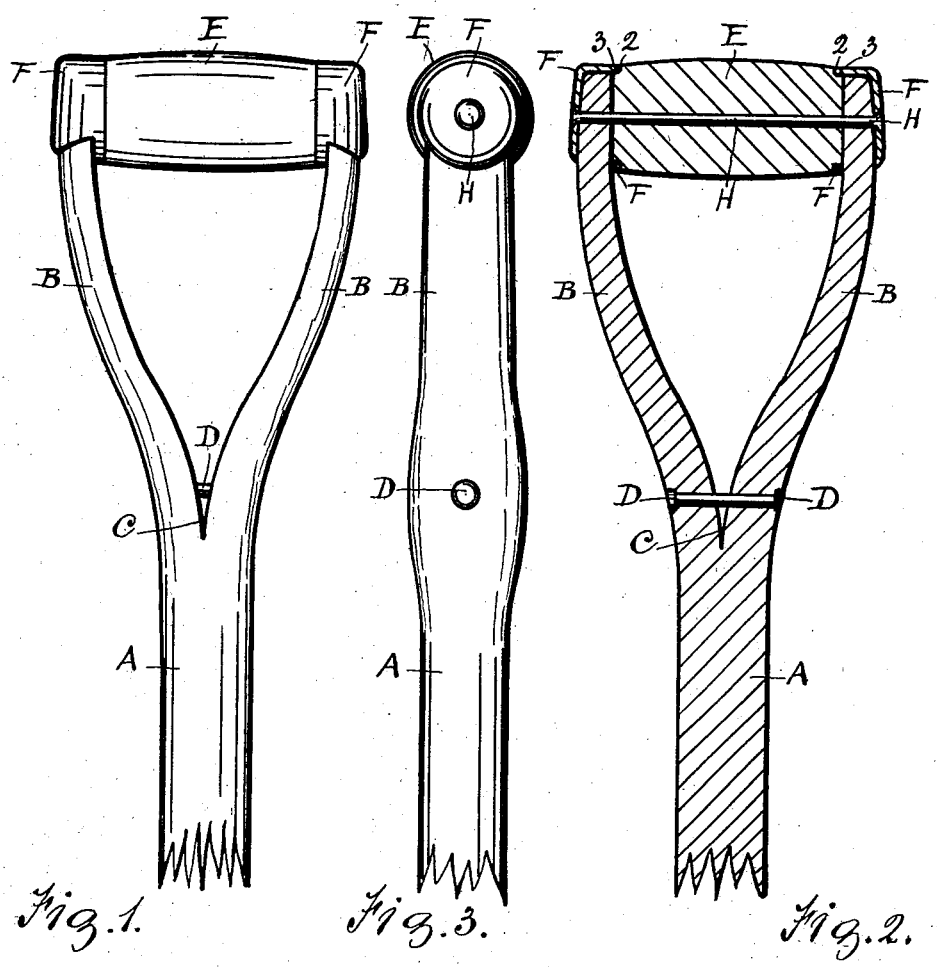
Witnesses.
Thos. J. Costigan.
L. E. George
Inventor.
Frederick Skelton,
By John K. Hendry
His Attorney.

UNITED STATES PATENT OFFICE.

FREDERICK SKELTON, OF HAMILTON, ONTARIO, CANADA, ASSIGNOR OF ONE-HALF TO EDWARD W. McCARTY, OF NEW YORK, N. Y.

HANDLE FOR SHOVELS, SPADES, AND OTHER TOOLS.

No. 914,678.   Specification of Letters Patent.   Patented March 9, 1909.

Application filed May 18, 1908. Serial No. 433,346.

*To all whom it may concern:*

Be it known that I, FREDERICK SKELTON, a citizen of the United States, and resident of Hamilton, in the county of Wentworth and Province of Ontario, Canada, have invented new and useful Improvements in Handles for Shovels, Spades, and other Tools, of which the following is a specification.

My invention relates to improvements in handles for shovels, spades and other tools, and comprises a transverse wood handle part, having reduced ends which fit into round transverse openings in metallic caps, or shells, a vertical handle, or trunk, having an enlargement, bifurcated tapering ends, or branches, extending from the enlarged part, fit into tapered openings in said caps, and contiguous with the ends of the transverse handle, said tapered openings being closed at their upper ends, and all held rigidly together by means of rivets through the transverse handle and through said enlarged root part, or commencement, of the bifurcated ends, or branches.

The objects of my invention are first, to provide a bifurcated handle for shovels and the like, whereby the several composite parts shall be even, smooth and rigid, one with the other, second, to provide means to prevent the possible splitting of the transverse member of the handle, third, to provide means for inclosing the ends of the bifurcated members of the handle, thereby preventing the weather from interfering with said ends or any protuberance of the same, fourth, to enlarge the commencement or root of the bifurcated part of the vertical handle or trunk, to prevent splitting, and fifth, to provide a bifurcated handle which shall be strong, durable, comparatively light and easily handled. I attain these objects by the device disclosed in the accompanying drawing, in which:—

Figure 1 is an elevation of the upper part of a handle for shovels, spades and the like. Fig. 2 is a sectional elevation of the same. Fig. 3 is a side elevation of the same. Fig. 4 is an enlarged elevation of a detached cap, or cover. Fig. 5 is a sectional elevation of Fig. 4 of the drawing. Fig. 6 is an end elevation of Fig. 4 of the drawing as viewed from the inner side of the cap.

Similar characters refer to similar parts throughout the several views.

In the drawing A is the vertical member or trunk, of the handle, and B are the bifurcated members or branches thereof, which taper from the commencement C, of the bifurcations to the ends thereof.

D, is a rivet through the branches B, to hold the same together, and is common, the parts of the handle around the rivet D, and above and below the root C, of the branches B are enlarged to strengthen said parts.

E is the transverse member of the handle, the ends of which are round, and reduced to fit snugly into the round inner end transverse openings, in the caps F. The shoulders 2 formed by the reduced ends 3 of the member E, fit closely to the inner face 4 of the caps F.

The end caps F, are of substantially cup-shaped design and are open at the bottom, and closed at the top. This feature is new and important, said openings are larger at the bottom than at the top, to admit the tapering ends of the branches B, said ends butt against the closed top of the caps, and are inclosed therein, thereby inclosing the ends of the branches against the weather, in order, that in consequence, there shall be no possible protuberance of the end wood of the branches B, thereby avoiding any possible rough and jagged ends of wood, on the transverse handle.

H is a common rivet through the transverse handle E, the branches B, and the caps F, to hold the same rigidly together.

The end caps F, having closed upper ends, to completely inclose the end parts of the branches B, this feature is a decided improvement and addition to my Canada Patent No. 104,844 dated 23rd. of April, 1907, and my United States Patent, Number 888,541, dated May 26, 1908.

What I claim as my invention and desire to secure by Letters Patent, is:—

1. A tool handle comprising a hand-grip having its end portions reduced, a bifurcated shank having tapering arms, said arms having enlarged portions, a bolt extending transversely through said portions, ferrules fitted on the reduced ends of said hand-grip and meeting flush with the surface of said grip, the tapered ends of said arms fitting within and wholly concealed by said ferrules, and a rivet passing through said arms, hand-grip and ferrules.

2. In a tool handle, the combination of a hand-grip, a bifurcated shank providing arms, closed cup-shaped ferrules on the ends of said hand-grip, adapted to receive and completely conceal the ends of the arms of said bifurcated shank, and a rivet passing through said ferrules, the bifurcated shank and hand-grip.

FREDERICK SKELTON.

Witnesses:
RICHARD BUTLER,
JOHN H. HENDRY.